UNITED STATES PATENT OFFICE.

AUGUSTE J. ROSSI, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD OF FERTILIZING VEGETABLE GROWTH.

1,032,432.

Specification of Letters Patent. Patented July 16, 1912.

No Drawing. Application filed May 4, 1910. Serial No. 559,319.

*To all whom it may concern:*

Be it known that I, AUGUSTE J. ROSSI, a citizen of the United States, and a resident of Niagara Falls, in the county of Niagara and State of New York, have invented certain new and useful Improvements in Method of Fertilizing Vegetable Growth, of which the following is a specification.

I have found, in the operation of my processes for producing ferro-titanium, as described in Letters Patent of the United States, Nos. 609,466 and 648,439, granted to me respectively on August 23, 1898 and May 1, 1900, as a by-product, certain quantities of nitrids of titanium, to wit, $Ti_2N_2$, $Ti_3N_2$, $Ti_3N_4$, etc. I have discovered that such compounds of titanium with nitrogen so produced are capable, when applied as per my improved method hereinafter described, of exceptionally fertilizing and stimulating vegetable growth. For example, on one occasion, as a test, I reduced to powder a body of such nitrid, associated, in that particular case, with some of my said alloys of iron and titanium, ferro-titanium, produced by my aforesaid patented methods, in the proportion of about 50 to 60% of said nitrid with 50 to 40% of said alloy, and thoroughly mixed the same with earth, such as is usually employed for agricultural purposes, in the proportion of about 5 to 10% of the said powder to 95 to 90% of the said earth. One of two containers or pots, of equal size and proportions, I filled with said earth; the other with an equal bulk of said earth and said powdered mixture in the aforesaid proportions. In said contents of each pot I then planted substantially the same quantity of similar seeds. The said two pots or containers with their contents were thereafter subjected, in all respects, to the same conditions of light, water, temperature, etc. The result was that germination of the seeds contained in the pot containing my said mixture occurred in about 7 days after planting, whereas in the other pot containing only the said earth the germination did not occur until about 12 days after planting. Observations of the growth of the respective vegetations were thereafter repeatedly made at stated intervals, with the result that the growth of the plants contained in the pot containing my said mixture was, within equal periods, twice to three times greater than that of the plants contained in the other.

My tests have satisfied me that nitrogen in the particular form mentioned, *i. e.* in chemical combination with titanium, unprecedentedly fertilizes and stimulates plant growth under ordinary agricultural conditions; also that the presence of metallic titanium may incidentally contribute to the more perfect accomplishment of this result.

My novel method of fertilizing and stimulating vegetable growth may be practically applied as per the procedure in the test above mentioned, it being understood that the earth employed is not necessarily potted but in its natural condition and status as contained in any field.

The above stated proportions of the nitrid of titanium to earth may be widely varied according to individual requirements of different plant species or soils, which will readily be determined in each instance by those skilled in the agricultural art. My method may be followed by first determining the nitrogen requirements of the particular earth to be fertilized. The soil is then prepared as usual, and the nitrid of titanium in preferably finely powdered form is mixed in the required proportions with the soil in any convenient well known manner, it being of course unnecessary to supply my said fertilizer containing nitrid of titanium except in reasonable proximity to the plant.

I am aware that nothing is more familiar in the agricultural art than the employment in a fertilizer of nitrogen, or other of its compounds than nitrid of titanium, to stimulate vegetable growth; but I am not aware that, prior to my said invention and my reduction thereof to practice, any chemical compound of nitrogen with titanium has been so employed, nor the above mentioned combination of such compounds of titanium and nitrogen with metallic titanium.

What I claim as new and desire to secure by Letters Patent is the following, viz:—

1. The above described method of stimulating vegetable growth which comprises supplying to the vegetable a mixture of nitrid of titanium and earth.

2. The method of stimulating vegetable growth which comprises supplying to the vegetable nitrid of titanium.

AUGUSTE J. ROSSI.

Witnesses:
  WALTER D. EDMONDS,
  GEORGE G. MEASURES.